(12) United States Patent
Floreancig

(10) Patent No.: US 9,484,844 B1
(45) Date of Patent: Nov. 1, 2016

(54) CIRCUIT AND METHOD FOR REDUCING INRUSH CURRENT OF PHASE CONVERTER MOTOR

(71) Applicant: Glen Floreancig, Phoenix, AZ (US)

(72) Inventor: Glen Floreancig, Phoenix, AZ (US)

( * ) Notice: Subject to any disclaimer, the term of this patent is extended or adjusted under 35 U.S.C. 154(b) by 0 days.

(21) Appl. No.: 15/131,293

(22) Filed: Apr. 18, 2016

Related U.S. Application Data

(60) Provisional application No. 62/148,615, filed on Apr. 16, 2015.

(51) Int. Cl.
*H02P 1/30* (2006.01)
*H02M 5/458* (2006.01)
*H02P 1/26* (2006.01)
*H02P 27/08* (2006.01)

(52) U.S. Cl.
CPC ............. *H02P 1/30* (2013.01); *H02M 5/4585* (2013.01); *H02P 1/265* (2013.01); *H02P 27/08* (2013.01)

(58) Field of Classification Search
CPC ............. H02P 1/00; H02P 1/26; H02P 1/30; H02P 1/38; H02P 1/54
USPC ................ 318/430, 431, 495, 500, 503, 504
See application file for complete search history.

(56) References Cited

U.S. PATENT DOCUMENTS

| | | | |
|---|---|---|---|
| 2,423,348 A | 7/1947 | Short | |
| 3,221,243 A | 11/1965 | Tango et al. | |
| 3,798,519 A * | 3/1974 | Habisohn | B66B 1/06 187/296 |
| 3,846,693 A * | 11/1974 | Compoly | H02M 7/539 307/58 |
| 4,618,809 A | 10/1986 | Maeda | |
| 4,644,241 A | 2/1987 | Maeda | |
| 4,683,413 A * | 7/1987 | Bax | H02P 1/28 318/729 |
| 4,745,348 A | 5/1988 | Young | |
| 4,777,421 A | 10/1988 | West | |
| 5,017,800 A | 5/1991 | Divan | |
| 5,218,283 A * | 6/1993 | Wills | H02P 25/04 318/123 |
| 5,272,616 A | 12/1993 | Divan et al. | |
| 5,402,053 A | 3/1995 | Divan et al. | |
| 5,883,486 A * | 3/1999 | Earhart, Jr. | H02P 1/26 318/778 |
| 5,969,957 A | 10/1999 | Divan et al. | |
| 6,297,971 B1 | 10/2001 | Meiners | |
| 7,859,217 B2 | 12/2010 | Mayhew | |
| 2009/0059625 A1 | 3/2009 | Viitanen et al. | |

* cited by examiner

*Primary Examiner* — Bentsu Ro
(74) *Attorney, Agent, or Firm* — Venjuris P.C.

(57) ABSTRACT

A method and circuit for starting a three-phase motor in a manner that reduces inrush current normally associated with starting an AC motor. The method uses the circuit to start the three phase motor gradually with three phase alternating current having relatively low frequency and gradually increasing the frequency up to or above the motor operating frequency over a period of time and then switching in a single phase alternating current supply to power the three phase motor.

20 Claims, 12 Drawing Sheets

CIRCUIT AND METHOD FOR REDUCING INRUSH CURRENT OF PHASE CONVERTER MOTOR

CROSS-REFERENCE TO RELATED APPLICATIONS

This application claims benefit of U.S. Provisional Application No. 62/148,615 filed Apr. 16, 2015.

BACKGROUND OF THE INVENTION

1. Field of the Invention

The present invention relates to a circuit and method of reducing the inrush current of an induction motor. The circuit is particularly useful in phase conversion applications such as to convert single phase alternating current conversion to three phase alternating current.

2. Description of the Prior Art

It is common in the art to use a three phase motor to generate three phase VAC power at the three phase motor terminals. A single phase VAC supply comprised of a hot leg and neutral conductor is coupled to at least two of the AC induction motor terminals, or a phase-shift capacitor may be used between the hot leg and the third AC induction motor terminal. When connected to the single phase VAC supply having a steady-state voltage and frequency the three phase motor will result in a significant inrush current drawn from the single phase VAC supply. Three phase motor start events can be accompanied by a temporary current draw of anywhere from 5-8 times the normal current draw. This temporary current demand can trip breakers or temporarily cause the power from the utility company to dip below acceptable standards. Thus, it is desirable to reduce or avoid inrush current encountered during three phase motor start events.

One manner of reducing inrush currents at three phase motor start events comprises using a Variable or Ramped Frequency three phase VAC drive or supply (VFD) to start the three phase motor. The VFD is coupled to the three phase motor and the frequency of the inverter three phase output is gradually increased until the three phase motor reaches a steady-state condition or a motor working speed. The gradual start of the three phase motor eliminates or significantly reduces inrush currents.

As one example, U.S. Pat. Nos. 5,272,616, 5,402,053, and 5,969,957 to Divan et al. disclose a single phase to three phase converter circuit that discloses converting single phase to DC and switching or inverting the DC to create three phase power. The converter may be operated in a startup mode, which provides three phase VAC power at a low frequency to start the motor and a second mode to wherein single-phase power is used to power the three phase motor. Divan et al. however teach that the inverter circuit is circuit is used to create single phase power which causes unnecessary expense and wear and tear on the components only during three phase motor start events. The present invention overcomes this and other shortcomings of the prior art.

BRIEF SUMMARY OF THE INVENTION

An abrupt start of an AC motor causes a large spike of inrush current from the very low impedance of the windings in a motor at rest. As the motor rises in speed the impedance of the windings increases and the generated back electromotive force (EMF) opposes the voltage applied to the windings thereby reducing the current through the windings. The inrush current can be in the range from 3-5 times the operating current necessary to keep the motor running at static or steady state operating speed. Objectives of the invention include a circuit and method of using the circuit to reduce or eliminate significant inrush currents.

The invention comprises a method and circuit for starting a three-phase motor in a manner that reduces inrush current normally associated with starting an AC motor. In the most general terms, the method comprises starting the three phase motor gradually rather than abruptly by the method of driving the motor terminals with alternating current having relatively low frequency and gradually increasing the frequency up to or above the motor operating frequency over a period of time. The gradual increase of the motor speed avoids the large inrush current associated with quick or abrupt starts.

The invention also comprises a system designed to accomplish the objectives of the invention and includes both a circuit and method of operating the circuit. Aspects of the system are implemented in a first subsystem to start the motor and a second subsystem to continue powering the motor after the first subsystem has had sufficient time to start the motor and gradually establish the motor steady state operating speed. The first subsystem comprises a three phase supply with variable frequency and the second subsystem comprises a static three phase supply. Each subsystem is multiplexed or alternately coupled to a three phase AC motor based on timing control that enables connection of the three phase motor to the variable frequency supply, start of the variable frequency supply, subsequent disconnection of the variable frequency supply from the three phase motor, and subsequent connection of static three phase supply to the motor.

Aspects of the invention may be incorporated in a single phase to three phase converter, comprising a single phase VAC supply input and a VAC output and an AC direct relay coupled electrically in series between the single phase VAC supply input and the VAC output. A rectifier having a rectifier VAC input and a rectifier DC output may be included with the rectifier VAC input coupled to the single phase VAC supply input. An inverter having an inverter circuit DC input, a plurality of inverter circuit switching inputs, and an inverter circuit three phase output, may also be included and the inverter circuit DC input coupled to the rectifier DC output. An inverter contactor may be coupled electrically in series between the inverter circuit three phase output and the VAC output, and a controller having a plurality of inverter control outputs respectively may be coupled to the plurality of inverter circuit switching inputs. A single phase VAC supply is connectable to the VAC output through the AC direct relay and the inverter circuit three phase output is connectable to the VAC output through the inverter contactor. The single phase to three phase converter described may be used with a method to start a three phase motor.

Aspects of the invention may be incorporated in a method of starting and running a three phase motor at a steady-state operating frequency to generate three phase VAC power. The method may comprise coupling the three phase motor to a VAC output, the VAC output having a VAC output first terminal, a VAC output second terminal, and a VAC output third terminal, the three phase motor first terminal coupled to the VAC output first terminal, the three phase motor second terminal coupled to the VAC output second terminal, the three phase motor third terminal coupled to the VAC output third terminal. A single phase VAC supply having a hot conductor and neutral conductor may be connected to a single phase VAC supply input, the single phase VAC supply input comprised of a VAC supply input first terminal and a VAC supply input second terminal, the hot conductor coupled to the VAC supply input first terminal and the neutral conductor coupled to the VAC supply input second terminal. The single phase VAC supply is converted to a direct current voltage and switched or inverted with a variable frequency drive comprised of an inverter first phase output, an inverter second phase output, and an inverter third phase output. The VAC output first terminal, VAC output second terminal, and VAC output third terminal are coupled to the inverter first phase output, the inverter second phase output, and the inverter third phase output, respectively, and the variable frequency drive switches the VAC output terminals from a starting frequency of about 0 Hz to a frequency within about 20 Hz of the three phase motor steady-state operating frequency at which point the inverter first phase output, inverter second phase output, and inverter third phase output are disconnected from the VAC output first terminal, the VAC output second terminal, and the VAC output third terminal, respectively, and the VAC supply input first terminal is coupled to the three phase motor first terminal and the VAC supply input second terminal is coupled to the three phase motor second terminal.

DESCRIPTION OF PREFERRED EMBODIMENTS

Figure 1:
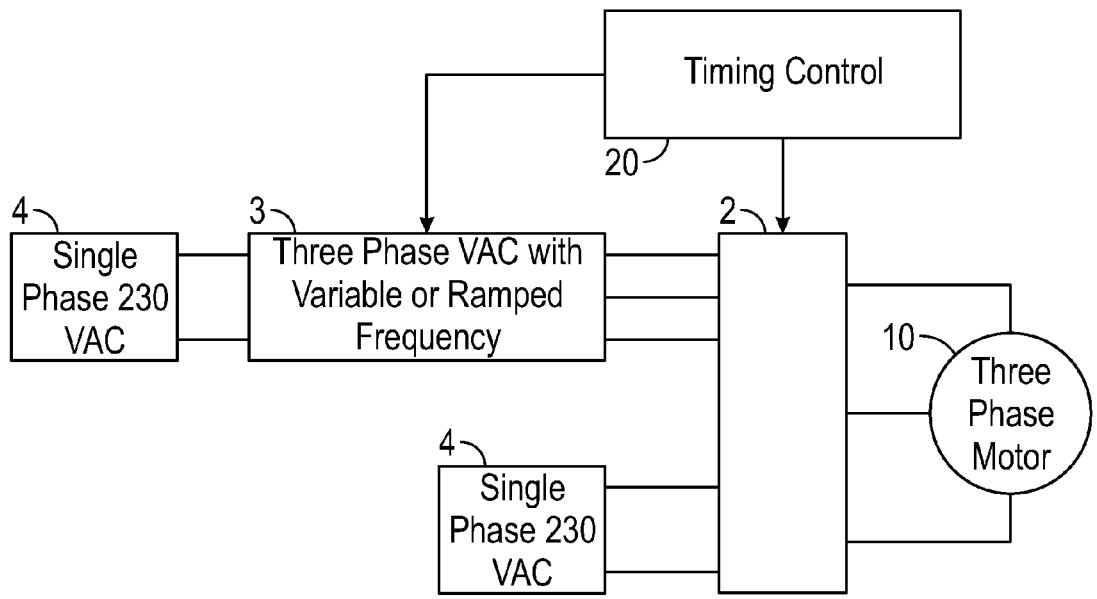
FIG. 1 illustrates a high-level block diagram illustrating a concept of the single phase to three phase converter described herein wherein a single phase VAC supply 4 is switched or multiplexed 2 with a variable or ramped frequency three phase supply 3 based on a timing control 20.

With reference to the general conceptual block diagram of FIG. 1, a single phase to three phase converter on which to implement the method of starting a three phase motor 10 comprises use of a static single phase single phase VAC supply 4 that is switched or multiplexed 2 using one or more switches, relays or contactors, with a variable or ramped frequency three phase supply 3 as controlled by timing control 20 to power a three phase motor 10. A general description of a preferred method of operation comprises coupling the variable or ramped frequency three phase supply 3 to a stopped three phase motor 10 and supplying the three phase motor 10 with three phase VAC power with gradually increasing frequency to gradually start the three phase motor 10 from 0 Hz to motor speed that is sufficient to cause the three phase motor 10 to have a back EMF that more closely matches the back EMF of a three phase motor 10 at normal operating speed, at which point the variable or ramped frequency three phase supply 3 is disconnected or switched or multiplexed 2 from the three phase motor 10 and the single phase VAC supply 4 is coupled or switched or multiplexed 2 to the three phase motor 10 until the system power is switched off to allow the three phase motor 10 to come to a stop. Use of the single phase to three phase converter according to the method described results in a significantly diminished, if not eliminated, inrush current relative to starting the three phase motor 10 by direct and immediate connection to the single phase VAC supply 4.

Figure 2:
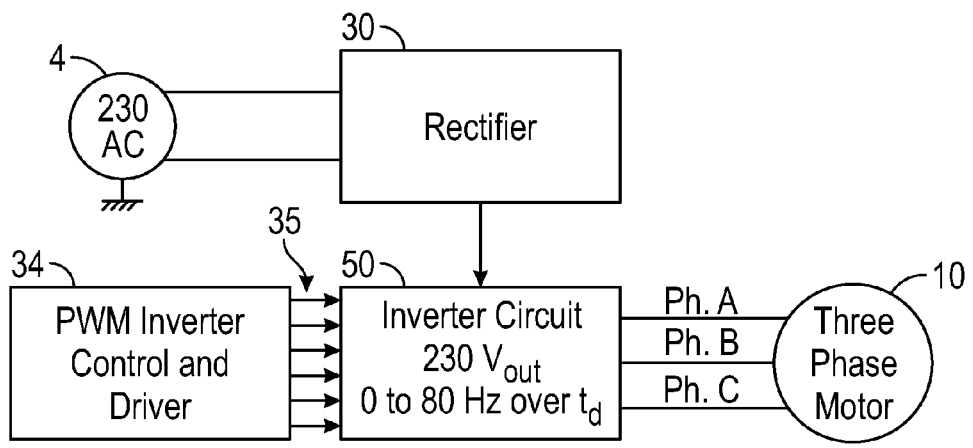
FIG. 2 illustrates a high-level block diagram of the variable or ramped frequency three phase supply 3 including a single phase VAC supply 4 coupled to a rectifier 30 to create direct current power that is supplied to a switching or inverter circuit 50 that will output three phase voltage on terminals connected to the three phase motor 10 based on the switch control timing 35 provided by an inverter control and driver circuit 34.

A conceptual block diagram of a variable or ramped frequency three phase supply 3 is illustrated in FIG. 2. The single phase VAC supply 4 is converted to Direct Current (DC) voltage or power by a rectifier sub circuit 30, which converted DC voltage or power is coupled to a switching or inverter sub circuit 50. The inverter sub circuit 50 comprises three VAC outputs (i.e. "Ph. A", "Ph. B", and Ph. C.") that are coupled or coupleable the three phase motor 10 through one or more switches, relays, or multiplexers 2 and are controlled or are controllable by switch control timing 35, such as from a processor, microprocessor, or a controller 200, to be 120 degrees apart in phase. Moreover, switch control timing 35 controls the switching to gradually increase the frequency of the three VAC outputs until the back EMF of the three phase motor 10 more closely matches the back EMF of a three phase motor 10 operating or running at the steady-state or normal operating speed. Starting the three phase motor 10 in a manner intended to reduce or eliminate relatively large inrush currents comprises timing control 20 operating one or more switches 2 to (i) couple the variable or ramped frequency three phase supply 3 to the three phase motor 10 and power the three phase motor 10 until its speed approaches, meets or exceeds a static or steady-state operating speed, and at which condition timing control 20 (ii) decouples the variable or ramped frequency three phase supply 3 from the three phase motor 10 and (iii) couples the static single phase VAC supply 4 to the three phase motor 10.

FIG. 2 illustrates a block diagram of a subsystem to create a variable or ramped frequency three phase supply 3. A rectifier sub circuit 30 creates direct current (DC) voltage from a single phase VAC supply 4 as is known in the art and can include soft-start, filtering and/or power regulating circuits to improve the quality of power delivered from the rectifier sub circuit 30 to an inverter sub circuit 50. Timing control 20 such as from a Pulse Width Modulated (PWM) inverter control 34 creates three phase drive signals 35 to control the timed switching of sold state device pairs in the inverter sub circuit 50 and gate the high voltage DC power created by the rectifier sub circuit 30 at timed intervals to create three phase power that is coupled to the three phase motor 10 terminals to start the three phase motor 10 and gradually bring it up to speed.

Figure 3:
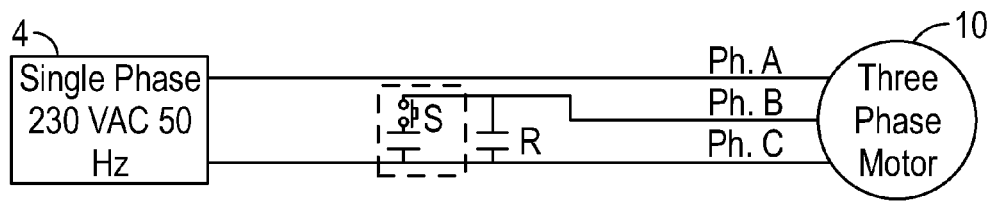
FIG. 3 illustrates a block diagram for an embodiment to power a three phase motor 10 from single phase VAC supply 4 wherein the normal start capacitor "S" and associated start contactor shown in the dashed block can be removed from embodiments implementing aspects of the present disclosure.

FIG. 3 illustrates a general block diagram of a static single phase to pseudo three phase converter supply, which use with the single phase to three phase converter is optional and depends on design choices. The static three phase supply converts the single phase VAC supply 4 by use of the three phase motor 10. The hot and neutral conductors of the single phase VAC supply 4 are coupled to two of the motor terminals and an optional capacitor that generates a 90 degree phase shift in the supply voltage for the third phase motor 10 terminal. The static three phase supply generates pseudo three phase power and works despite that the voltage phases are not 120 degrees apart. It is also acceptable and within the scope of the invention to use a static three phase supply that more accurately creates AC voltages having 120 degrees phase shift or to connect the hot and neutral conductors of the single phase VAC supply 4 only and leave the third terminal of the three phase motor 10 unconnected.

FIGS. 4-8 illustrate a preferred embodiment of a single phase to three phase converter and includes components and sub circuits that implement the functions described herein. The use of the sub circuits and components permits an efficient relatively inexpensive apparatus and method to start and operate a three phase motor 10 whilst reducing or eliminating the inrush current normally associated with a three phase motor 10 start event. Further, despite that the preferred embodiment is disclosed in sub circuits, it would be within the skill of one of ordinary skill to modify the teachings herein to combine one or more of the sub circuits or create additional sub circuits that perform the same functions. A more detailed description of the connections between components and sub circuits follows.

The illustrated embodiment includes a single phase VAC supply input 40 having a VAC supply input first terminal 42 and a VAC supply input second terminal 44 and a VAC output 60 having a VAC output first terminal 62, a VAC output second terminal 64 and a VAC output third terminal 66. A single phase VAC supply 4 is attachable to the single phase VAC supply input 40 and the single phase to three phase converter operates the methods described herein and creates and outputs three phase power at the VAC output 60. In a first operational state or mode or startup mode, the single phase to three phase converter operates a method to gradually start a three phase motor 10 from a stopped condition until the three phase motor 10 reaches a steady state operating speed, at which time or condition the single phase to three phase converter switches to a second mode, a steady-state mode, and powers the three phase motor 10 directly from the single phase VAC supply 4. Operation of the single phase to three phase converter according to the described method results in significantly reduced inrush current for three phase motor 10 starting events.

The preferred single phase to three phase converter incorporates a processor, microcontroller, or controller 200 that outputs control signals to implement timing control 20 outputs to the several sub circuits described herein and to one or more solid state or electromechanical contactors, switches, or relays to depending on whether the single phase to three phase converter is in startup mode or in steady state mode. In startup mode, the controller 200 of the preferred single phase to three phase converter controls or enables at least one electrically operable switch, contactor, or relay, a rectifier 30, and an inverter 50 to create three phase VAC power from the single phase VAC supply 4, which three phase VAC power is used to start the three phase motor 10 and gradually increase the speed of the three phase motor 10 until it reaches a steady-state speed as determined by programming or a time delay, or by actually measuring the speed of the three phase motor 10 using one or more sensors. Moreover, it is preferable but not necessary that one or more of the functions or circuits described herein be implemented in a distinct sub circuit that interoperates with other components or sub circuits within the single phase to three phase converter described herein. Thus, despite that the rectifier 30 and inverter 50 are referred to as "sub circuits" in the preferred embodiment, it is to be understood that various implementations of either exist and different levels of integration within the system are included within the scope of the present description.

Figure 4A:
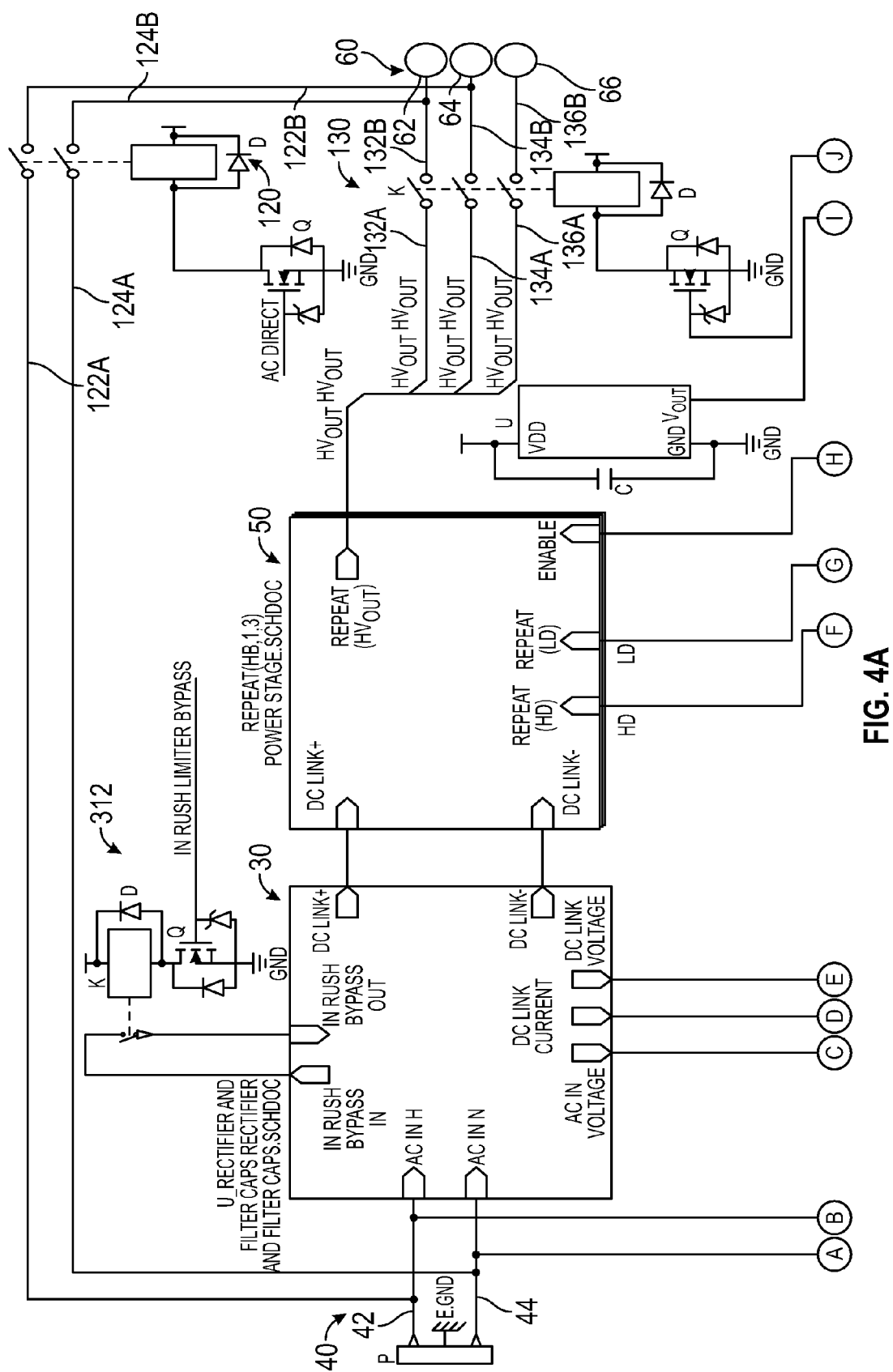
FIG. 4A illustrates a single phase VAC supply input 40, a rectifier sub circuit 30, and a switching or inverter sub circuit 50.
Figure 4B:
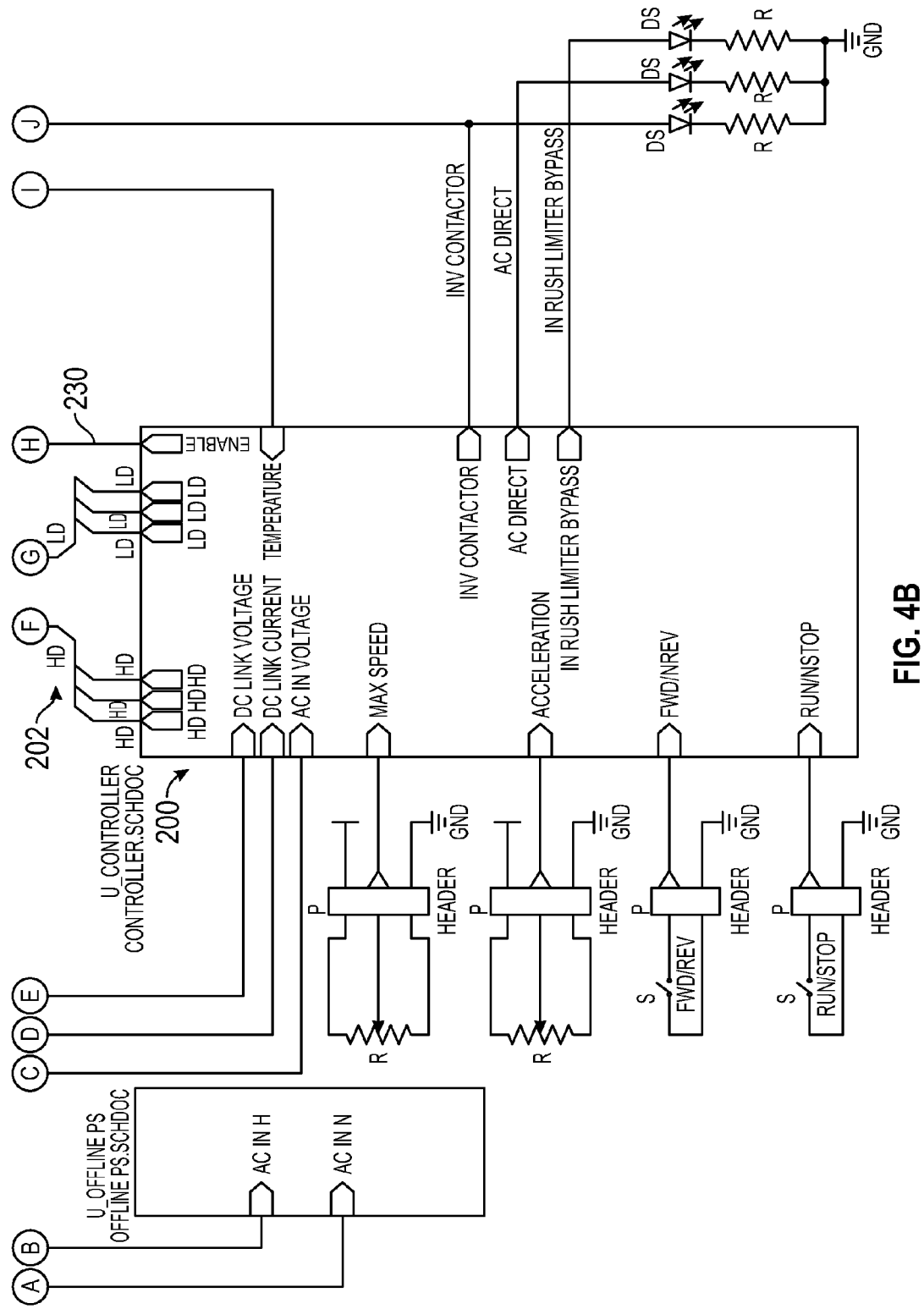
FIG. 4B illustrates a controller 200 that implements timing control 20, an electrically operable DPST switch, contactor, or relay 120 and an electrically operable TPST switch, contactor, or relay 130, and a three terminal VAC output 60 that can be coupled to a three phase motor 10.
Figure 5A:
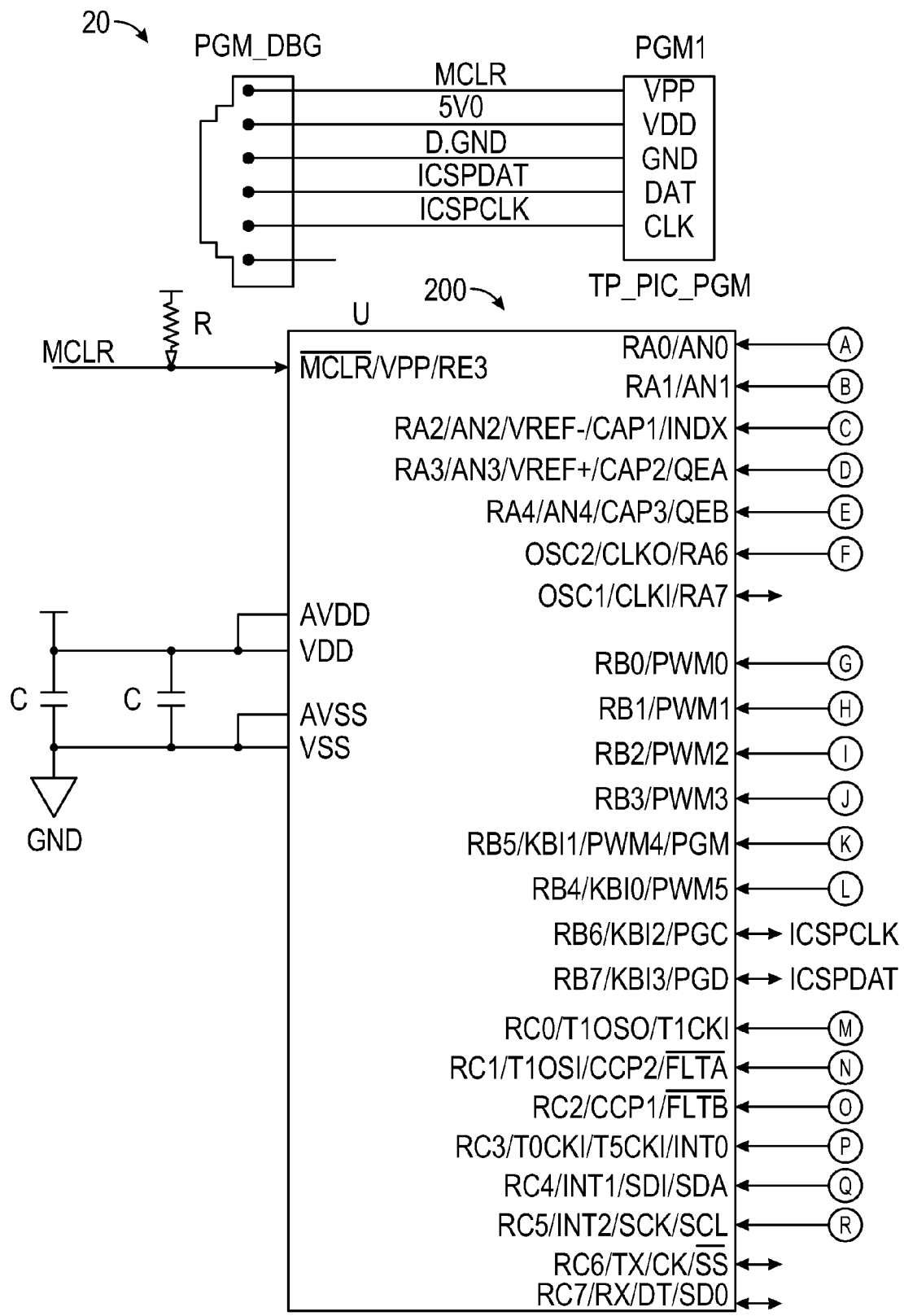
FIGS. 5A-5B illustrate additional details of an integrated solid state timing controller 200 implementing timing control 20 and having switch control timing 35 outputs in the form of a plurality of inverter control outputs 202, and a plurality of inputs and outputs including but not limited to, electrically operable switch outputs.
Figure 5B:
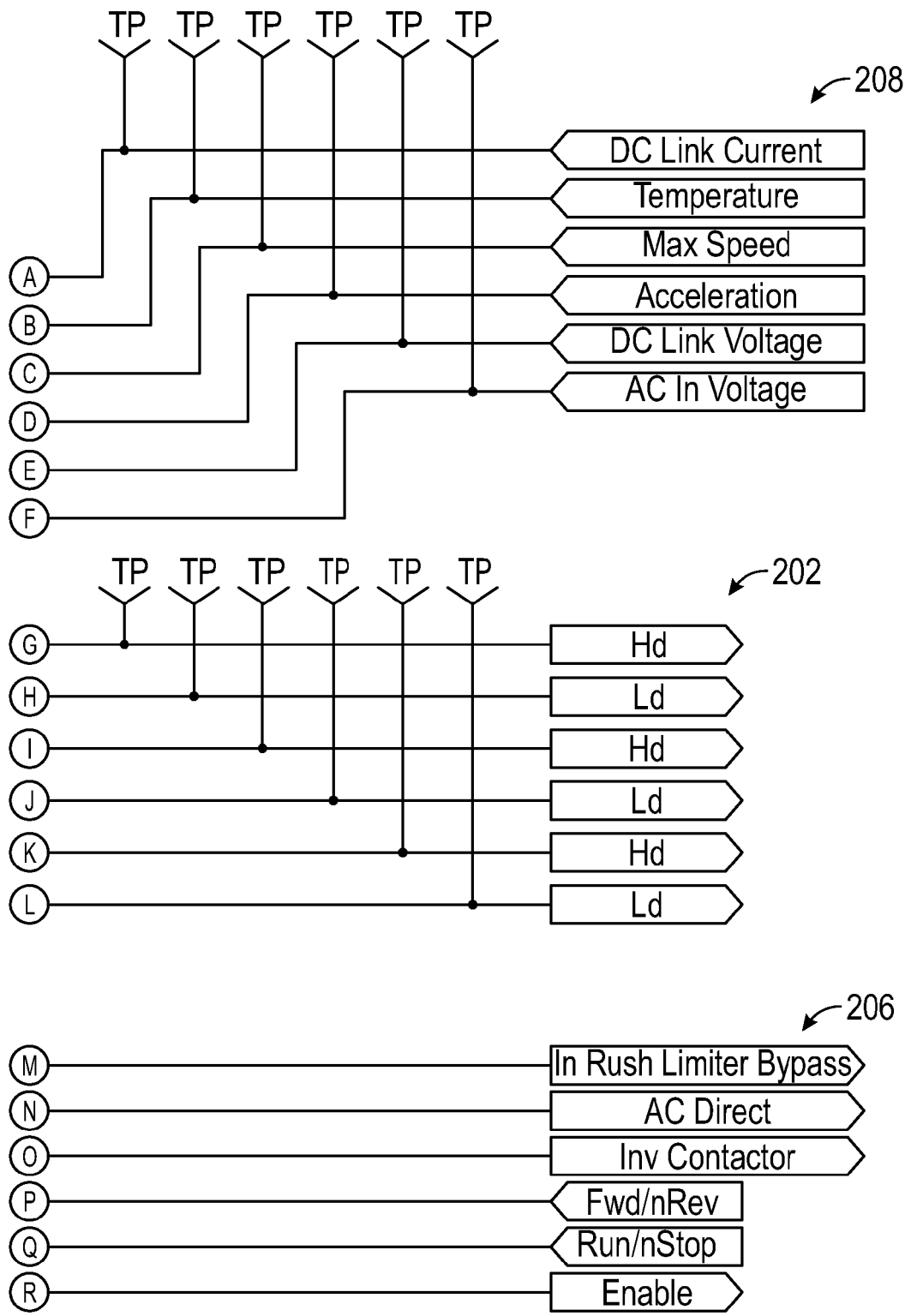

A preferred controller 200 is illustrated in FIGS. 4B, 5A, 5B, and includes a plurality of inverter control outputs 202, including a differential inverter control first output ("Hd1", "Ld1"), a differential inverter control second output ("Hd2", "Ld2"), and a differential inverter control third output ("Hd3", "Ld3") that output a first phase, a second phase, and a third phase switching signals, respectively, and that are coupled to the inverter sub circuit 50 to control the switching of power transistors therein. Further timing control 20 outputs includes one or more control signals 206 such as but not limited to an AC direct relay control signal (e.g. "ACDirect") that controls an AC direct combination switch, contactor or relay during steady-state mode and an inverter contactor control signal (e.g. "InvContactor") that controls an inverter contactor, switch, or relay during startup mode. Additional control signals may include an inverter sub circuit enable signal (e.g. "Enable") to collectively enable an integrated gate driver that is coupled to and directs the switching of the power transistor outputs of the inverter sub circuit 50, and an inrush bypass limiter relay enable signal that controls an inrush limiter relay 312 that can disconnect the rectifier VAC input 302 of the rectifier sub circuit 30 from the hot conductor of the single phase VAC supply input 40 to prevent damage to the rectifier sub circuit 30 in the event of significant in rush current to the rectifier sub circuit 30 upon coupling of the three phase motor 10 to the single phase VAC supply input 40. The controller 200 may also include inputs 208 to accept feedback from sub circuits or other circuitry in the single phase to three phase converter such as from a thermistor, or current or voltage sense inputs (e.g. DCLinkCurrent" and "DCLinkVoltage", respectively) or three phase motor 10 speed or acceleration inputs. An exemplary controller 200 comprises controller that includes Pulse Width Modulation (PWM) software routines for 3-phase AC induction motor control and programmable input/output ports, such as but not limited to, the PIC18F2431. An alternative controller 200 and configuration is described in the provisional patent from which the application claims benefit, with provisional application is hereby incorporated by reference in its entirety.

Electrical power to the preferred single phase to three phase converter is input to a single phase VAC supply input 40, which includes a VAC supply input first terminal 42 and a VAC supply input second terminal 44. The hot leg of the single phase VAC supply 4 is coupled or attachable to the VAC supply input first terminal 42 and the neutral conductor of the single phase VAC supply 4 is coupled or attachable to the VAC supply input second terminal 44. See FIG. 4A. In steady-state mode, the AC direct relay control signal of the controller 200 enables the AC direct relay to connect the single phase VAC supply 4 to the three phase motor 10 terminals and power the three phase motor 10 until a stop or shut-off event is initiated. Power from the single phase VAC supply 4 applied to the VAC supply input first terminal 42 and the VAC supply input second terminal 44 conductors is also routed within the single phase to three phase converter for use in sub circuits described below if the single phase to three phase converter is in startup mode. Power from the single phase to three phase converter in either mode however, is obtained from a VAC output 60, which includes a first VAC output first terminal 62, a VAC output second terminal 64, and a VAC output third terminal 66, which are respectively attachable to the terminals of a three phase motor 10.

Steady-state mode follows startup mode and is characterized by the three phase motor 10 operating a steady state speed or frequency. In steady-state mode the hot and neutral conductors from the single phase VAC supply 4 are coupled through the AC direct relay to at least two of the terminals of a three phase motor 10, or three of the terminals of the three phase motor 10 if a phase shift capacitor or circuit is incorporated with the single phase to three phase converter. The AC direct relay comprises a plurality of AC direct relay input terminals that are respectively connectable to a plurality of AC direct relay output terminals as enabled by an AC direct relay control terminal and the hot and neutral conductors from the single phase VAC supply 4 are respectively connectable or disconnectable to the three phase motor 10 by or through the plurality of AC direct relay input terminals and plurality of AC direct output terminals. Moreover, while the AC direct relay may be composed of individual switching components, a preferred AC direct relay is collectively electrically operable and may be selected from a double pole single throw (DPST) device selected from switches, relays and contactors. Thus, an exemplary or preferred AC direct relay may comprise an electrically operable DPST switch, contactor or relay 120 as illustrated and the plurality of AC direct relay input terminals comprise a DPST device input first terminal 122A and a DPST device input second terminal 124A, respectively, and the plurality of AC direct output terminals a DPST device output first terminal 122B and a DPST device output second terminal 124B, respectively, and the AC direct relay control terminal comprises a DPST device coil terminal 126. Alternative embodiments are also possible and it would be within the knowledge of one of ordinary skill to use a plurality of electrically operable single pole single throw switches, relays, or contactors, to couple the conductors of the single phase VAC supply input 40 to the three phase motor 10. As an example, the hot and neutral conductors from the single phase VAC supply 4 could be coupled to the three phase motor 10 by a first switch and a second switch respectively, which first switch and second switch are respectively coupled electrically in series with the hot and the neutral conductors, respectively, of the single phase VAC supply input 40 and the VAC output 60. In such embodiment, the AC direct relay is comprised of a combination of the first switch and the second switch. The first switch includes a first switch input terminal, a first switch output terminal, and a first switch control terminal and the first switch input terminal is coupled to the VAC supply input first terminal 42, and the first switch output terminal is coupled to the VAC output first terminal 62. The first switch control terminal is coupled to the AC Direct relay control signal and enables or disables current flow between the first switch input terminal and the first switch output terminal. Likewise, the second switch includes a second switch input terminal, a second switch output terminal, and a second switch control terminal. The second switch input terminal is coupled to the VAC supply input second terminal 44 and the second switch output terminal coupled to the VAC output second terminal 64 and the second switch control terminal enables is also coupled to the AC Direct relay control signal that enables or disables current flow between the second switch input terminal and the second switch output terminal. In such an alternative, the first switch input terminal and the second switch input terminal would comprise the DPST device input first terminal 122A, the DPST device input second terminal 124A, respectively, and the first switch output terminal and the second switch output terminal would comprise the DPST device output first terminal 122B and a DPST device output second terminal 124B, and the first switch control terminal and second switch control terminal collectively comprise a DPST device coil terminal 126. While steady-state mode relies on single phase VAC supply 4 for powering the three phase motor 10 as described above; startup mode requires creation of 3-phase VAC power to start the three phase motor 10 as described below.

In startup mode the single phase to three phase converter uses the single phase VAC supply 4 power to create three phase VAC power at the VAC output 60. The single phase VAC supply 4 power is rectified and switched by an inverter sub circuit 50 to create variable frequency three phase VAC power that is used to gradually start the three phase motor 10. The controller 200 operates an inverter contactor to couple the variable frequency three phase VAC power to the VAC output 60 and start the three phase motor 10. The inverter contactor preferably comprises a combination device but may alternatively be comprised of individual components such as for example, a third, fourth and fifth switch, each having a switch input terminal, a switch output terminal, and a switch control terminal. In such an embodiment, the third switch input terminal may be coupled to the inverter first phase VAC output 504A and the third switch output terminal coupled to the VAC output first terminal 62, the fourth switch input terminal may be coupled to the inverter second phase output 504B and the fourth switch output terminal coupled to the VAC output second terminal 64, and likewise, the fifth switch input terminal may be coupled to the inverter third phase output 504C and the fifth switch output terminal coupled to the VAC output third terminal 66. Further, the controller 200 may have a plurality of switch control outputs coupled to the first, second, third, fourth, and fifth switch control terminals, respectively. While the inverter contactor may be implemented in distinct devices, the preferred inverter contactor is collectively electrically operable and selected from electrically operable triple pole single throw (TPST) devices selected from TPST switches, relays and contactors. Thus the third switch input terminal, the fourth switch input terminal, and fifth switch input terminal comprise a TPST device input first terminal 132A a TPST device input second terminal 134A, and a TPST device input third terminal 136A, respectively, and the third switch output terminal, the fourth switch output terminal, and the fifth switch output terminal comprise a TPST device output first terminal 132B, a TPST device output second terminal 134B, and a TPST device output third terminal 136B. The third switch control terminal, the fourth switch control terminal, and the fifth switch control terminal collectively comprise a TPST device coil terminal 138.

As is known in the art, the input and output and terminal numbers of the electrically operable double pole single throw (DPST) device or the electrically operable triple pole single throw (TPST) device are arbitrary and the identification thereof should not be interpreted to imply otherwise. Moreover, either or both the DPST or TPST may be either a normally-closed or normally-open variety provided that the controller 200 is programmed to open or close the electrically operable DPST relay 120 according the requirements of the methods and circuit described herein. Additionally, rather than operating either or both of the AC direct relay or the inverter contactor based on control signals from the controller 200, it is alternatively possible to operate or control either or both devices off a time delay function or circuit. For example, a three phase motor 10 start event could start a count down on a timer that gives sufficient time for the startup mode to complete its operation, after expiration of the timer countdown would trigger a decoupling or opening of the inverter relay and a subsequent closing of the AC direct relay. Of course, this is but one alternative of which there are others that would be obvious to a person having ordinary skill in light of the teachings and results intended herein.

Figure 6A:
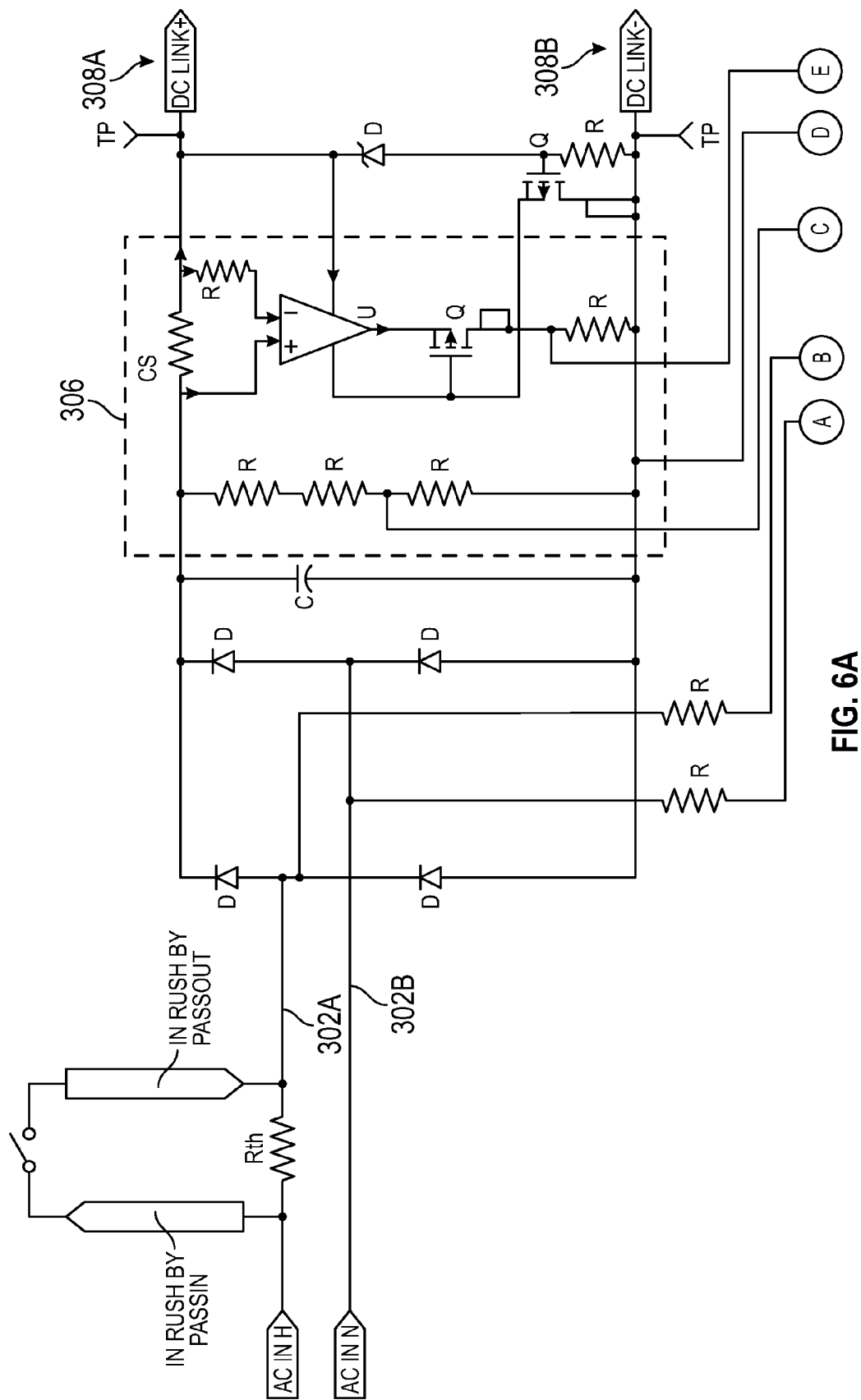
FIGS. 6A-6C illustrate a rectifier sub circuit 30 including diode bridge input terminals, 302A and 302B, diode bridge output terminals 308A and 308B, a current sense circuit 306, and a sensing output circuit 310.
Figure 6B:
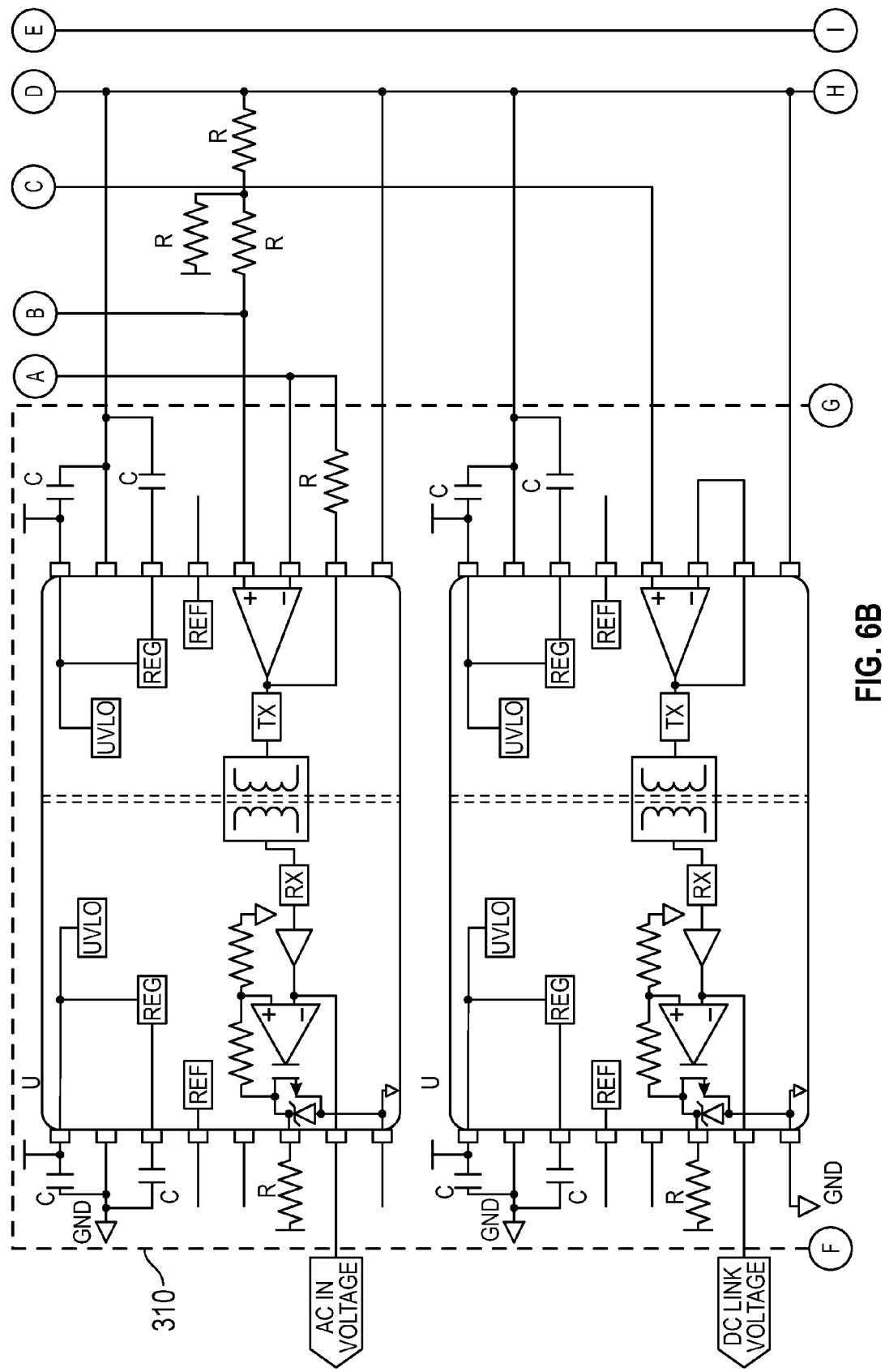
Figure 6C:
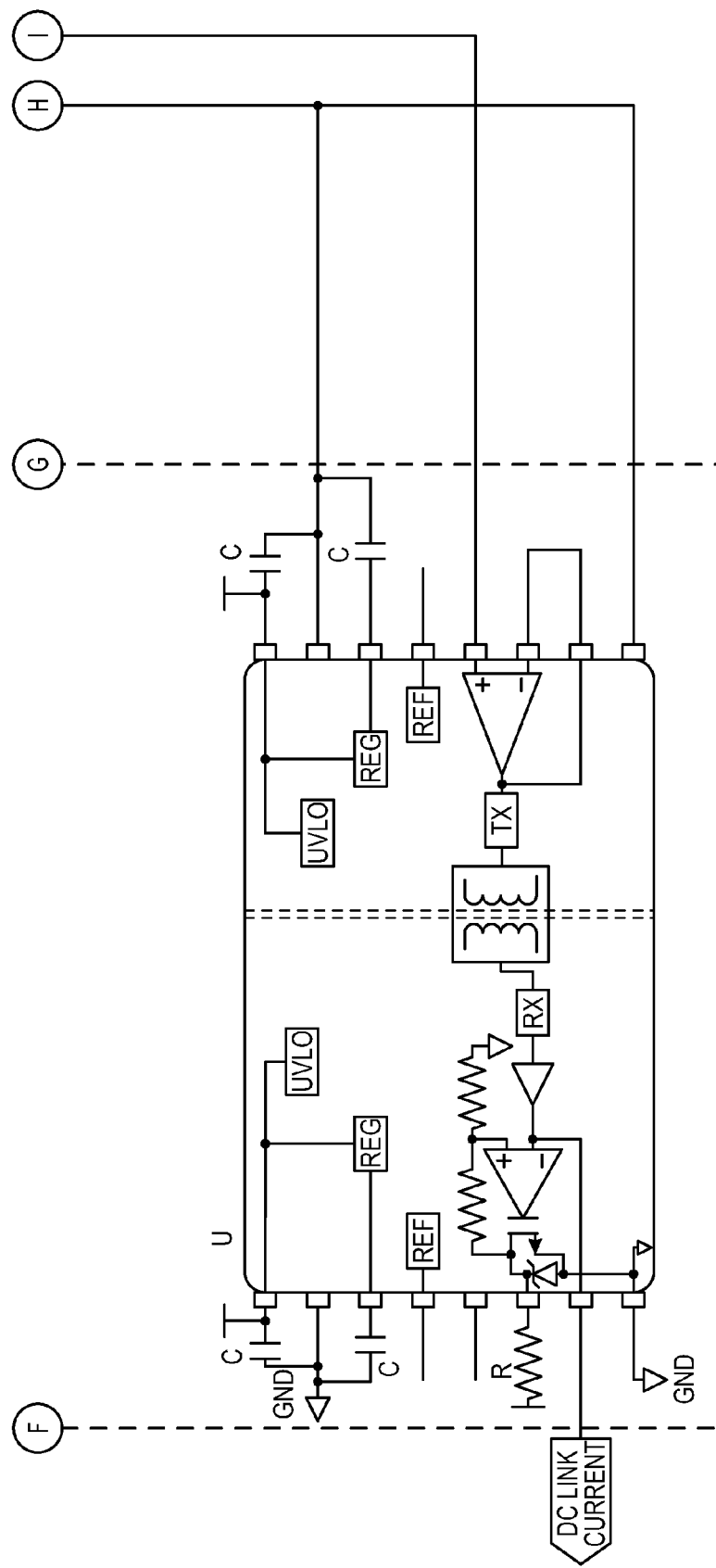

A preferred rectifier sub circuit 30 is illustrated in FIGS. 6A-6C and comprises a diode bridge input and diode bridge output. The VAC supply input first terminal 42 and VAC supply input second terminal 44 are coupled to the diode bridge input. The diode bridge output is coupled to the rectifier sub circuit output 30. In the illustrated embodiment, the VAC supply input first terminal 42 and VAC supply input second terminal 44 are connected to the diode bridge input nodes or terminals, 302A and 302B, as is known in the art, and the electrical transfer characteristics of the diodes connected as illustrated create a high voltage direct current voltage potential or differential at the diode bridge output nodes or terminals, 308A and 308B. The terminals of an inrush limiter relay 312 may be coupled electrically in series with at least one of the diode bridge input terminals, 302A and 302B to prevent damage to the rectifier sub circuit 30 components from high currents at the rectifier VAC input 302. The inrush limiter relay 312 may be controlled by an inrush bypass limiter relay enable signal from the controller 200 in the event of high currents at the rectifier VAC input 302. A capacitor may be coupled between diode bridge output terminals, 308A and 308B, to store charge and filter the DC power. A voltage and current sensing sub circuit 306 is also coupled to the diode bridge output terminals, 308A and 308B, to provide feedback from the rectifier sub circuit 30 to the controller 200. Voltage sensing is accomplished by measuring, sampling, or monitoring the voltage at a node between at least two series connected resistors that are coupled between the diode bridge output terminal 308A and 308B. Current sensing is accomplished with a current sensing circuit having a current sense resistor in coupled electrically series between the diode bridge and the positive diode bridge output terminal 308A. The voltage sensing node and current sense readings are input to the sensing output circuit 310 that isolates the inverter sub circuit 50 and outputs the sensed voltage and current to the controller 200. The neutral leg of the diode bridge input terminal 302B is also input to the sensing output circuit 310 for feedback to the controller 200. Direct current voltage available from the rectifier sub circuit 30 is coupled to the inverter sub circuit 50, which creates an inverter three phase output from the direct current voltage as controlled by the controller 200.

Figure 7A:
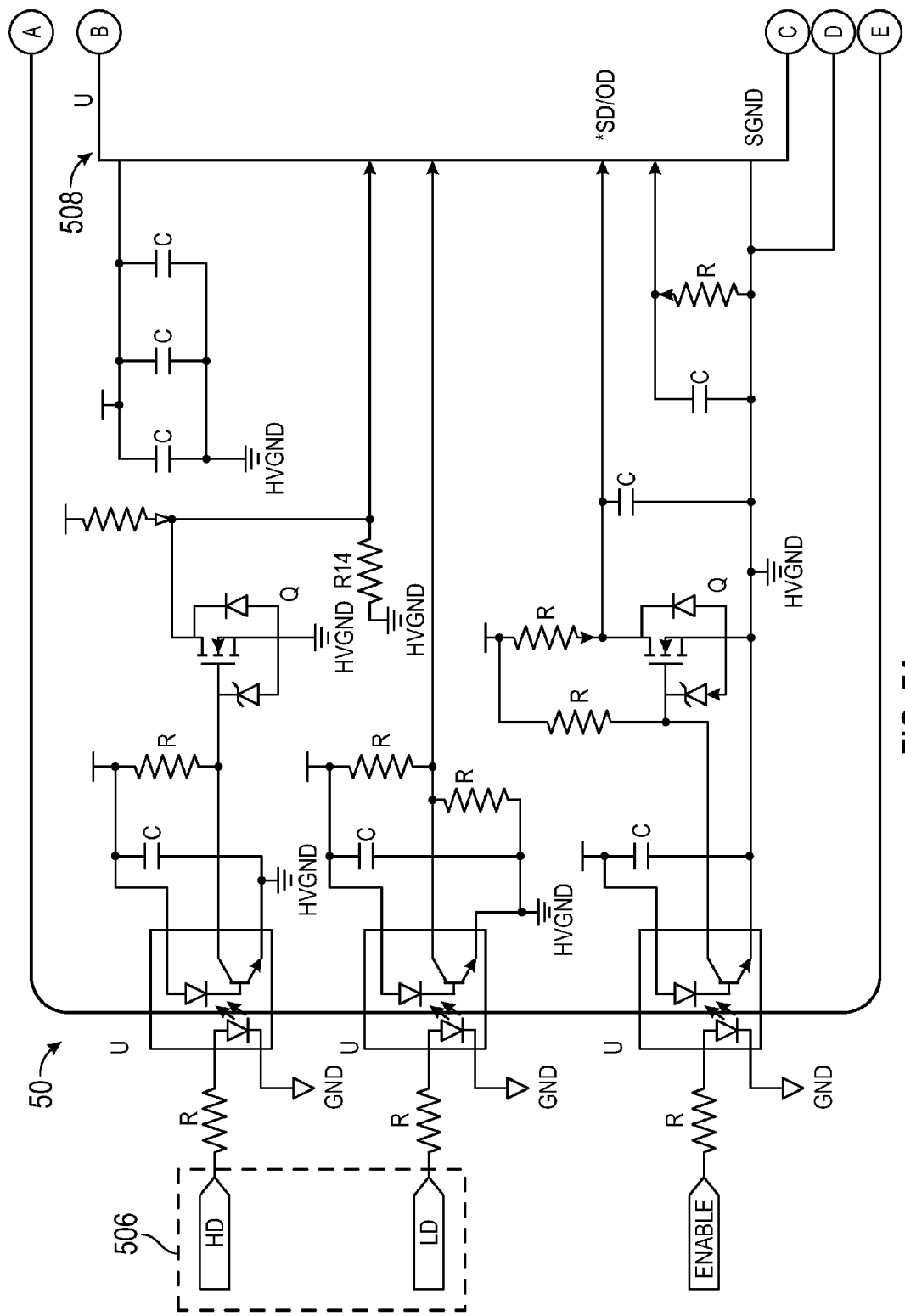
FIGS. 7A-7B illustrate an inverter sub circuit 50 including plurality of inverter circuit switching inputs 506, signal conditioning circuitry, a solid state gate driver 508, and a pair of power transistors electrically coupled in a VAC push-pull output configuration 510.
Figure 7B:
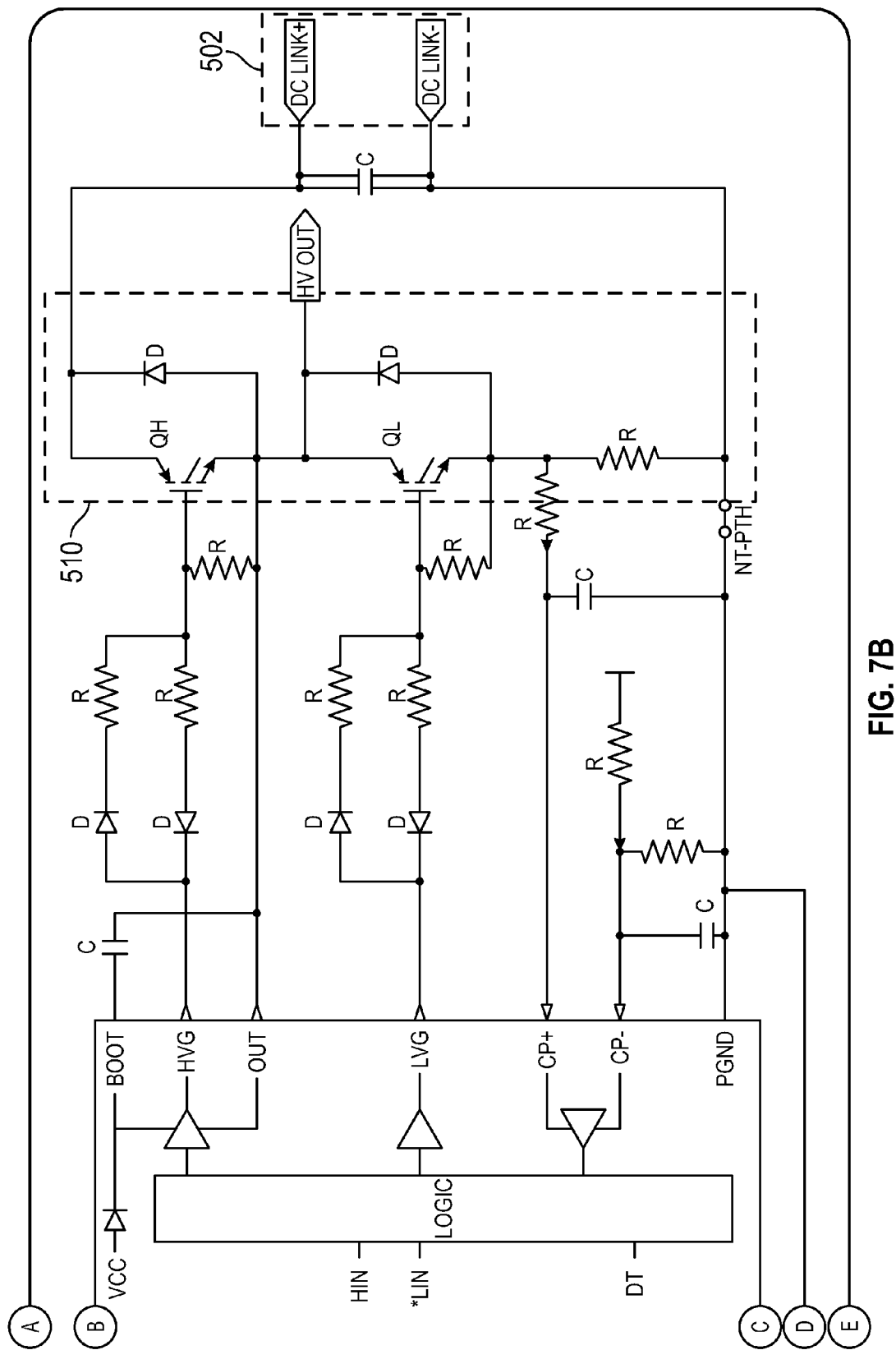
Figure 8:
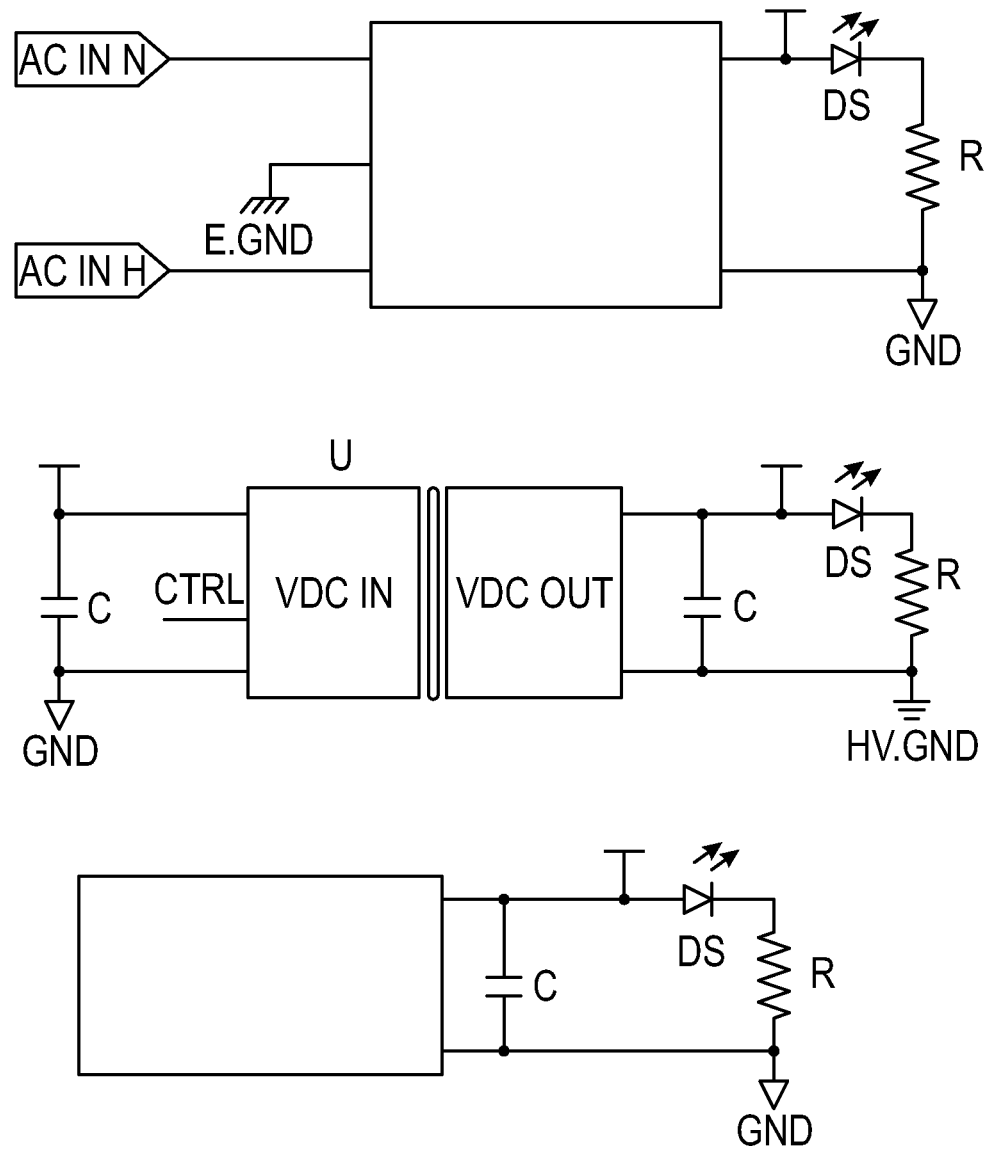
FIG. 8 illustrates additional circuitry to create DC voltages used within the embodiment.
Figure 9:
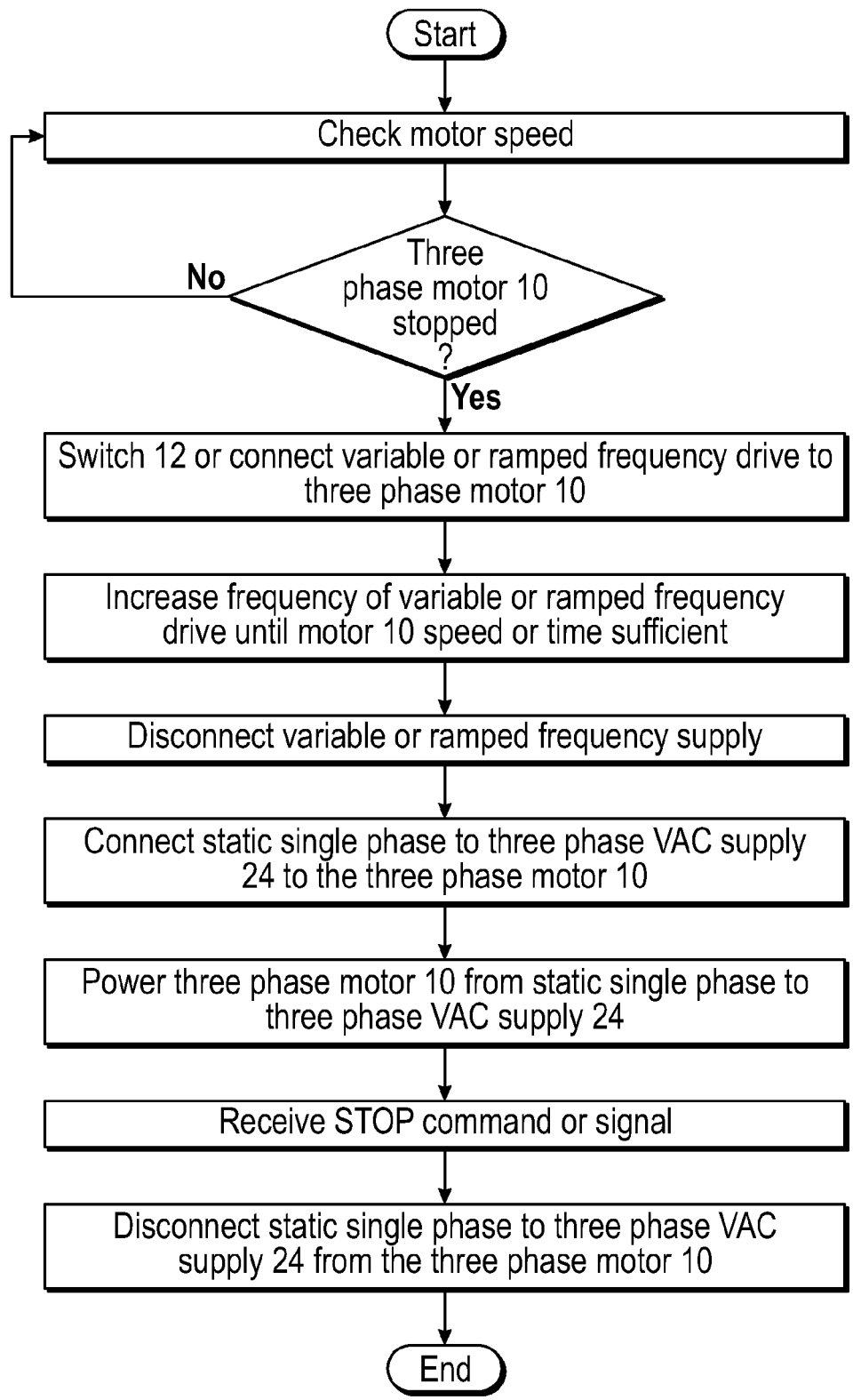
FIG. 9 illustrates a flow diagram for operating an embodiment of the process or method of the description.

The preferred inverter sub circuit 50 is illustrated in FIGS. 7A-7B and comprises three inverter outputs that produce three-phase VAC power as controlled by the controller 200. A portion or third of a preferred inverter sub circuit 50 is illustrated in FIG. 7 and includes an inverter circuit DC input 502 that is coupled to the diode bridge output terminals 308A and 308B of the rectifier sub circuit 30. The illustrated inverter sub circuit 50 outputs a single switched VAC output and therefore is duplicated twice more to create three switched VAC outputs that are each controllable by the controller 200 to produce a single phase of the three phase switched VAC output, respectively. Each inverter sub circuit 50 includes an isolated input stage, such as by solid state optical isolators, comprised of at least one inverter circuit switching input, but preferably complementary, inverter circuit switching inputs 506, that are coupled to the input of an integrated solid state gate driver circuit 508 the outputs of which are coupled to the gates of power transistors electrically coupled together as a push-pull output 510 configuration. Each of the VAC push-pull outputs 510 are each coupled to the inverter three phase output 504, and in particular, the inverter first phase output 504A, inverter second phase output 504B, and the inverter third phase output 504C, respectively, which are each connectable to the VAC output first terminal 62, the VAC output second terminal 64, and the VAC output third terminal 66, respectively, through the inverter contactor. As is known in the art, the power transistors may comprise Insulated Gate Bipolar Junction Transistors (IGBT) or MOSFETs depending on the performance desired or the size or horsepower of the three phase motor 10 and as illustrated, a high-voltage Schottky diode may be electrically coupled across the collector and emitter of the IGBT to protect the transistors from damage due to over-voltage.

The inverter sub circuit 50 and controller 200 create a variable frequency drive (VFD) with programmable and controllable three-phase VAC power that is output from the single phase to three phase converter via the VAC output 60. The controller 200 is programmed or programmable to increase the frequency of the plurality of inverter control outputs 202 from 0 Hz to a steady-state switching frequency, which is preferably at least about the steady-state operating frequency of the three phase motor 10 but preferably greater. As one example, the steady state frequency can be in the range of about 40-80 Hz, but preferably should be about 70-80 Hz. Further, while the preferred single phase to three phase converter embodiment described herein comprises a VFD having a voltage-source drive inverter design, it would be within the skill of one having ordinary skill to modify the design herein to implement a phase controlled current-source inverter drive. Or alternatively, it may be preferably to slowly increase the amplitude of the inverter circuit 3-phase output signals to reduce inrush current to the three phase motor 10.

Operation Modes

In steady-state mode the single phase to three phase converter provides a pseudo two-phase or, with the addition of a capacitor, pseudo three-phase power, and in startup mode the single phase to three phase converter produces three-phase power with a ramping frequency. Steady-state mode is characterized by the single phase to three phase converter outputting pseudo two-phase or, with the addition of a capacitor, pseudo three-phase power at the VAC output 60. The VAC output 60 is thereafter coupleable to a three phase motor 10 to create three-phase power rather than pseudo two-phase or pseudo three phase power. Steady-state mode is ordinarily operated after the single phase to three phase converter has brought the three phase motor 10 up to or above steady-state operating frequency upon the completion of startup mode.

In steady-state mode, the controller 200 opens the inverter contactor and closes the AC direct relay, which couples the single phase VAC directly to the VAC output 60 to power the three phase motor 10. Thus in steady-state mode, the hot leg of the single phase VAC supply is coupled to the first VAC supply input terminal 42 and the neutral leg of the single phase VAC is coupled to the second VAC supply input terminal 44. In the preferred embodiment, the VAC supply input first terminal 42 is coupled to the DPST relay input first terminal 122A and the VAC supply input second terminal 44 is coupled to the DPST relay input second terminal 124A. And, the electrically operable DPST relay 120 is closed so the DPST relay input first terminal 122A is coupled to the DPST relay output first terminal 122B and the DPST relay input second terminal 124A is coupled to the DPST relay output second terminal 124B, which are each connected to two of the three VAC output terminals to create pseudo two-phase power (0 degrees, and 180 degrees) i.e. the VAC output first terminal 62, VAC output second terminal 64, or VAC output third terminal 66, which are respectively connected to the terminals of the three phase motor 10. As previously described, a phase-shift capacitor may be switched-in to electrically couple the VAC output first terminal 62 and the VAC output third terminal 66, or alternatively the VAC output second terminal 64 and the VAC output third terminal 66 to create pseudo three-phase power (0 degrees, 90 degrees, 180 degrees, or 0 degrees, 180 degrees, and 270 degrees), the capacitor creating a ~90 degree phase shift that more closely approximates the one hundred twenty degree phase shift that is generated by the three phase motor 10. Finally, in steady-state mode the controller 200 may disable the rectifier sub circuit 30 and/or the inverter sub circuit 50 to conserve power.

Startup mode is characterized by the single phase to three phase converter outputting three-phase power with gradually increasing or ramped frequency at the VAC output 60. In startup mode the AC direct relay (e.g. the electrically operable DPST relay 120) is open-circuited and the inverter contactor (e.g. the electrically operable TPST relay 130) is closed and the rectifier sub circuit 30 and inverter sub circuit 50 create three-phase power that is coupled via the second contactor 13 to the VAC output 60 to power the three phase motor 10. In startup mode the controller 200 closes the inverter contactor, which allows the three phase VAC power from the inverter sub circuit 50 to flow through the VAC output 60 and gradually start the three phase motor 10 with a gradually increasing frequency. The single phase to three phase converter can be used with a method to start and run a three phase motor 10 with reduced inrush current. A preferred method comprises creating three-phase VAC power with a variable frequency drive, switching-in and starting the three phase motor 10 with the variable frequency drive, and then switching-out the variable frequency drive and switching-in a single phase VAC supply to continue powering the three phase motor 10.

An example three phase motor 10 has a steady-state operating frequency and a three phase motor first terminal 10A, a three phase motor second terminal 10B, and a three phase motor third terminal 10C. A method of starting the three phase motor 10 with the single phase to three phase converter comprises coupling the three phase motor 10 to the VAC output 60, the VAC output first terminal 62, the VAC output second terminal 64, and the VAC output third terminal 66, coupled to the three phase motor first terminal 10A, the three phase motor second terminal 10B, and the three phase motor third terminal 10C. A single phase VAC supply having a hot conductor and neutral conductor is coupled to the single phase VAC supply input 40 having a VAC supply input first terminal 42 and a VAC supply input second terminal 44, the hot conductor coupled to the VAC supply input first terminal 42 and the neutral conductor coupled to the VAC supply input second terminal 44. The VAC output first terminal 62, VAC output second terminal 64, and VAC output third terminal 66 are coupled to the inverter first phase output 504A, the inverter second phase output 504B, and the inverter third phase output 504C, respectively. To start the three phase motor 10, the single phase VAC supply is converted to a direct current voltage and the direct current voltage is switched with the variable frequency drive to generate an inverter three phase output 504 comprised of an inverter first phase output 504A, an inverter second phase output 504B, and an inverter third phase output 504C. Moreover, the frequency of the variable frequency drive is increased from a starting frequency of about 0 Hz to a steady state frequency within about 20 Hz of the steady-state operating frequency of the three phase motor 10. Alternatively, the frequency of the variable frequency drive is increased gradually, such as linearly or non-linearly, from a starting frequency of about 0 Hz for a time delay of about 3 to 15 seconds. After reaching the steady-state operating frequency or expiration of the time delay, the inverter three phase output 504 is disconnected from the VAC output 60 and the VAC supply input first terminal 42 is coupled to the three phase motor first terminal 10A and the VAC supply input second terminal 44 is coupled to the three phase motor second terminal 10B.

For startup mode, because the inverter contactor is coupled electrically in series between the inverter three phase output 504 and the VAC output 60, coupling the VAC output first terminal 62, VAC output second terminal 64, and VAC output third terminal 66 to the inverter first phase output 504A, the inverter second phase output 504B, and the inverter third phase output 504C, respectively, comprises respectively connecting the plurality of inverter contactor input terminals to the plurality of inverter contactor output terminals. Similarly, disconnecting the inverter first phase output 504A, inverter second phase output 504B, and inverter third phase output 504C from the VAC output first terminal 62, the VAC output second terminal 64, and the VAC output third terminal 66, respectively, comprises disconnecting the plurality of inverter contactor input terminals from the plurality of inverter contactor output terminals. For steady-state mode, because the AC direct relay is coupled electrically in series between the single phase VAC supply input 40 and the VAC output 60, coupling the VAC supply input first terminal 42 to the three phase motor first terminal 10A and coupling the VAC supply input second terminal 44 to the three phase motor second terminal 10B comprises respectively connecting the plurality of AC direct relay input terminals to the plurality of AC direct relay output terminals.

Alternatively, the AC direct relay may comprise a first switch and a second switch that each comprise electrically operable relays and include a first switch control terminal and a second switch control terminal, respectively, and closing the first switch and second switch comprises receiving at least one control signal such as from a timer or from a controller 200 to the first switch control terminal and the second switch control terminal, respectively. The first switch and the second switch may be each selected from switches, contactors and relays and may comprise an electrically operable double pole single throw switch, relay or contactor.

Moreover, the step of coupling the VAC output first terminal 62, the VAC output second terminal 64, the VAC output third terminal 66 to the inverter first phase output 504A, the inverter second phase output 504B, and the inverter third phase output 504C, respectively, may comprise closing a third switch having a third switch input terminal that is coupled to the inverter first phase output 504A and a third switch output terminal coupled to the VAC output first terminal 62, closing a fourth switch comprising a fourth switch input terminal coupled to the inverter second phase output 504B and a fourth switch output terminal coupled to the VAC output second terminal 64, and closing a firth switch having a firth switch input terminal that is coupled to the inverter third phase output 504C and a third switch output terminal coupled to the VAC output third terminal 66. The third switch, the fourth switch, and the fifth switch, may be each selected from switches, contactors and relays and each comprise an electrically operable triple pole single throw switch, relay or contactor. Closing the third switch, the fourth switch, and fifth switch comprises receiving at least one control signal from a controller 200 or a timer circuit to the third switch control terminal, the fourth switch control terminal, and the fifth switch control terminal, respectively.

Operation of the single phase to three phase converter may further include control of a plurality of inverter circuit switching inputs 506 and increasing the frequency of the variable frequency drive from a starting frequency of about 0 Hz to a steady state frequency within about 20 Hz of the steady-state operating frequency comprises increasing the switching frequency of the plurality of inverter circuit switching inputs 506 from a starting frequency of about 0 Hz to a steady state frequency within about 20 Hz of the steady-state operating frequency. The controller 200 may include a plurality of inverter control outputs 202 that are respectively connected to the plurality of inverter circuit switching inputs 506 and the controller 200 may increase the switching frequency of the plurality of inverter control outputs 202 from a starting frequency of about 0 Hz to a steady state frequency within about 20 Hz of the three phase motor 10 steady-state operating frequency. Further, as previously described the AC direct relay may comprise a first switch and second switch or may comprise a combination DPST device and the inverter contactor may comprise a third, fourth and fifth switch or may comprise a combination electrically operable TPST device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A single phase to three phase converter, comprising:
a single phase VAC supply input and a VAC output;
an AC direct relay coupled electrically in series between the single phase VAC supply input and the VAC output;
a rectifier having a rectifier VAC input and a rectifier DC output, the rectifier VAC input coupled to the single phase VAC supply input;
an inverter having an inverter circuit DC input, a plurality of inverter circuit switching inputs, and an inverter circuit three phase output, the inverter circuit DC input coupled to the rectifier DC output;
an inverter contactor coupled electrically in series between the inverter circuit three phase output and the VAC output; and
a controller having a plurality of inverter control outputs respectively coupled to the plurality of inverter circuit switching inputs;
wherein a single phase VAC supply is connectable to the VAC output through the AC direct relay and the inverter circuit three phase output is connectable to the VAC output through the inverter contactor.

2. The single phase to three phase converter in claim 1 wherein,
the AC direct relay includes a relay control terminal, the inverter contactor includes a contactor control terminal, and the controller includes a relay control output and an inverter contactor control output coupled to the relay control terminal and the inverter contactor control terminal, respectively.

3. The single phase to three phase converter in claim 2 wherein,
the AC direct relay is selected from a double pole single throw (DPST) devices selected from switches, relays, and contactors.

4. The single phase to three phase converter in claim 2 wherein,
the inverter contactor is selected from electrically operable triple pole single throw (TPST) devices selected from switches, relays, and contactors.

5. The single phase to three phase converter in claim 2 wherein,
the plurality of inverter control outputs further comprises an inverter control first output, an inverter control second output, and an inverter control third output that output a first phase, a second phase, and a third phase switching signal, respectively.

6. The single phase to three phase converter in claim 5 wherein,
the controller operates on a software program to increase the frequency of the switching signals from 0 Hz to a steady-state switching frequency.

7. The single phase to three phase converter in claim 2 wherein,
the rectifier comprises a diode bridge input and diode bridge output, the VAC supply input first terminal and VAC supply input second terminal are coupled to the diode bridge input, the diode bridge output coupled to the rectifier output.

8. A method of starting and running a three phase motor at a steady-state operating frequency to generate three phase VAC power, the three phase motor comprising a three phase motor first terminal, a three phase motor second terminal, and a three phase motor third terminal, the method comprising:
coupling the three phase motor to a VAC output, the VAC output having a VAC output first terminal, a VAC output second terminal, and a VAC output third terminal, the three phase motor first terminal coupled to the VAC output first terminal, the three phase motor second terminal coupled to the VAC output second terminal, the three phase motor third terminal coupled to the VAC output third terminal;
connecting a single phase VAC supply having a hot conductor and neutral conductor to a single phase VAC supply input, the single phase VAC supply input comprised of a VAC supply input first terminal and a VAC supply input second terminal, the hot conductor coupled to the VAC supply input first terminal and the neutral conductor coupled to the VAC supply input second terminal;

converting the single phase VAC supply to a direct current voltage;

switching the direct current voltage with a variable frequency drive, the variable frequency drive having an inverter circuit three phase output comprised of an inverter first phase output, an inverter second phase output, and an inverter third phase output;

coupling the VAC output first terminal, VAC output second terminal, and VAC output third terminal to the inverter first phase output, the inverter second phase output, and the inverter third phase output, respectively;

with the variable frequency drive, switching the direct current voltage from a starting frequency of about 0 Hz to a frequency within about 20 Hz of the three phase motor steady-state operating frequency;

disconnecting the inverter first phase output, inverter second phase output, and inverter third phase output from the VAC output first terminal, the VAC output second terminal, and the VAC output third terminal, respectively; and coupling the VAC supply input first terminal to the three phase motor first terminal and coupling the VAC supply input second terminal to the three phase motor second terminal.

9. The method of claim 8 wherein,
an inverter contactor is coupled electrically in series between the inverter circuit three phase output and the VAC output, the inverter contactor having a plurality of inverter contactor input terminals respectively connectable to a plurality of inverter contactor output terminals, and coupling the VAC output first terminal, VAC output second terminal, and VAC output third terminal to the inverter first phase output, the inverter second phase output, and the inverter third phase output, respectively, comprises respectively connecting the plurality of inverter contactor input terminals to the plurality of inverter contactor output terminals.

10. The method of claim 9 wherein,
disconnecting the inverter first phase output, inverter second phase output, and inverter third phase output from the VAC output first terminal, the VAC output second terminal, and the VAC output third terminal, respectively, comprises disconnecting the plurality of inverter contactor input terminals from the plurality of inverter contactor output terminals.

11. The method of claim 10 wherein,
the inverter contactor is electrically operable and selected from switches, relays and contactors and disconnecting the plurality of inverter contactor input terminals from the plurality of inverter contactor output terminals comprises receiving a control signal to an inverter contactor control terminal.

12. The method of claim 11 wherein,
the inverter contactor comprises an electrically operable TPST device and the plurality of inverter contactor input terminals comprise a TPST device input first terminal, a TPST device input second terminal, and a TPST device input third terminal, and the plurality of inverter contactor output terminals comprise a TPST device output first terminal, a TPST device output second terminal, and a TPST device output third terminal.

13. The method of claim 8 wherein,
an AC direct relay is coupled electrically in series between the single phase VAC supply input and the VAC output, the AC direct relay having a plurality of AC direct relay input terminals respectively connectable to a plurality of AC direct output terminals, and coupling the VAC supply input first terminal to the three phase motor first terminal and coupling the VAC supply input second terminal to the three phase motor second terminal comprises respectively connecting the plurality of AC direct relay input terminals to the plurality of AC direct relay output terminals.

14. The method of claim 9 wherein,
the AC direct relay is electrically operable and selected from switches, relays and contactors and connecting the plurality of AC direct relay input terminals to the plurality of AC direct relay output terminals comprises receiving a control signal to an AC direct relay control terminal.

15. The method of claim 14 wherein,
the AC direct relay comprise a electrically operable DPST device and the plurality of AC direct input terminals comprise a DPST device input first terminal and a DPST device input second terminal and the plurality of AC direct output terminals comprise a DPST device output first terminal and a DPST device output second terminal, and coupling the VAC supply input first terminal to the three phase motor first terminal and coupling the VAC supply input second terminal to the three phase motor second terminal comprises connecting the DPST device input first terminal and the DPST device input second terminal to the DPST device output first terminal and the DPST device output second terminal, respectively.

16. The method of claim 9 wherein,
coupling the VAC output first terminal, the VAC output second terminal, the VAC output third terminal to the inverter first phase output, the inverter second phase output, and the inverter third phase output, respectively, comprises closing a third switch having a third switch input terminal that is coupled to the inverter first phase output and a third switch output terminal coupled to the VAC output first terminal, closing a fourth switch comprising a fourth switch input terminal coupled to the inverter second phase output and a fourth switch output terminal coupled to the VAC output second terminal, and closing a firth switch having a firth switch input terminal that is coupled to the inverter third phase output and a third switch output terminal coupled to the VAC output third terminal.

17. The method of claim 8 wherein,
the variable frequency drive comprises a plurality of inverter circuit switching inputs and increasing the frequency of the variable frequency drive from a starting frequency of about 0 Hz a frequency within about 20 Hz of the steady-state operating frequency comprises increasing the switching frequency of the plurality of inverter circuit switching inputs from a starting frequency of about 0 Hz to a frequency within about 20 Hz of the steady-state operating frequency.

18. The method of claim 17 wherein,
a controller has plurality of inverter control outputs that are respectively connected to the plurality of inverter circuit switching inputs and the controller increases the switching frequency of the plurality of inverter control outputs from a starting frequency of about 0 Hz to a frequency within about 20 Hz of the steady-state operating frequency.

19. A single phase to three phase converter, comprising:
a single phase VAC supply input and a VAC output;
a first switch, selected from switches, relays and contactors, coupled electrically in series between the single phase VAC supply input and the VAC output;
a rectifier having a rectifier VAC input and a rectifier DC output, the rectifier VAC input coupled to the single phase VAC supply input;
an inverter having an inverter circuit DC input, a plurality of inverter circuit switching inputs, and an inverter circuit three phase output, the inverter circuit DC input coupled to the rectifier DC output;
a second switch, selected from switches, relays, and contactors, coupled electrically in series between the inverter circuit three phase output and the VAC output; and
a controller having a plurality of inverter control outputs respectively coupled to the plurality of inverter circuit switching inputs;
wherein a single phase VAC supply is connectable to the VAC output through the AC direct relay and the inverter circuit three phase output is connectable to the VAC output through the inverter contactor.

20. The single phase to three phase converter in claim 19 wherein,
the first switch and second switch are each electrically operable and selected from switches, relays and contactors.

* * * * *